United States Patent
Lection et al.

(10) Patent No.: US 10,550,594 B2
(45) Date of Patent: Feb. 4, 2020

(54) AUTOMATED CLEANING DEVICE

(71) Applicant: International Business Machines Corporation, Armonk, NY (US)

(72) Inventors: David B. Lection, Raleigh, NC (US); Sarbajit K. Rakshit, Kolkata (IN); Mark B. Stevens, Austin, TX (US); John D. Wilson, League City, TX (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 15/492,336

(22) Filed: Apr. 20, 2017

(65) Prior Publication Data

US 2018/0305948 A1    Oct. 25, 2018

(51) Int. Cl.
| | |
|---|---|
| *E04H 4/16* | (2006.01) |
| *C02F 1/00* | (2006.01) |
| *B64C 39/02* | (2006.01) |
| *E04H 4/12* | (2006.01) |
| *B64D 1/22* | (2006.01) |
| *C02F 103/42* | (2006.01) |

(52) U.S. Cl.
CPC ......... *E04H 4/1654* (2013.01); *B64C 39/024* (2013.01); *B64D 1/22* (2013.01); *C02F 1/004* (2013.01); *C02F 1/008* (2013.01); *E04H 4/1209* (2013.01); *C02F 2103/42* (2013.01)

(58) Field of Classification Search
CPC .......... C02F 1/001; C02F 1/004; C02F 1/008; C02F 2103/42; C02F 2201/006; C02F 2201/008; E04H 4/1209; E04H 4/1654; E04H 4/1663; E04H 4/1672

See application file for complete search history.

(56) References Cited

U.S. PATENT DOCUMENTS

| | | |
|---|---|---|
| 6,815,918 B2 | 11/2004 | Porat et al. |
| 8,784,652 B2 | 7/2014 | Rief et al. |
| 9,758,980 B2 | 9/2017 | Ben Don et al. |
| (Continued) | | |

FOREIGN PATENT DOCUMENTS

| | | |
|---|---|---|
| EP | 2835478 A2 | 2/2015 |
| IR | 2812015 A1 | 1/2002 |
| WO | 2014144093 A1 | 9/2014 |

OTHER PUBLICATIONS

Simoncelli, Maurizio, et al; "Autonomous Pool Cleaning: Self localization and Autonomous Navigation for Cleaning", Autonomous Robots 9, No. 3 (2000): 261-270.

*Primary Examiner* — Terry K Cecil
(74) *Attorney, Agent, or Firm* — Scully, Scott, Murphy & Presser, PC; Samuel A. Waldbaum, Esq.

(57) ABSTRACT

A submersible automated cleaning device includes a device body having a filter canister mounted within the device body. A plurality of filter cassettes is releasably mounted within the filter canister, each filter cassette having a filter bag and a float bag. A cartridge is mounted to the device body configured to release a gas into one of the float bags to inflate the float bag. A controller is configured to activate the cartridge to release the gas into the float bag in response to detecting that the filter bag is full and to release the filter cassette from the filter canister upon inflation of the float bag. A method for removing the floating debris bag includes capturing and removing the floating cassette by a drone. A cassette collection method includes activating a pool skimmer pump and detecting that the cassette has reached the pool skimmer.

15 Claims, 5 Drawing Sheets

(56) References Cited

U.S. PATENT DOCUMENTS

| | | |
|---|---|---|
| 2007/0094817 A1 | 5/2007 | Stoltz et al. |
| 2009/0057238 A1 | 3/2009 | Garti |
| 2009/0301522 A1 | 12/2009 | Abehasera et al. |
| 2011/0049023 A1 | 3/2011 | Hui |
| 2011/0226282 A1 | 9/2011 | Choi et al. |
| 2014/0096329 A1 | 4/2014 | Garti et al. |
| 2015/0128361 A1 | 5/2015 | Erlich et al. |
| 2015/0267433 A1 | 9/2015 | Leonessa et al. |
| 2015/0275537 A1 | 10/2015 | Witelson et al. |
| 2015/0292222 A1 | 10/2015 | Tamar et al. |
| 2018/0073264 A1 | 3/2018 | Klebanov |

AUTOMATED CLEANING DEVICE

BACKGROUND OF THE INVENTION

This disclosure is directed to an automated cleaning system, and more particularly to a submersible automated cleaning device and a debris bag collection system.

Robots are known to be used for cleaning pools. Based on the location of debris, the robot identifies a route and accordingly cleans the pool. The debris is captured in debris bag. The debris bag has limited capacity. Once the bag is full, the the robot has to be removed from the pool and the owner has to install a new bag to continue cleaning. This known pool cleaning robot results in unproductive time and causing the pool cleaning take a longer time than desired. There is another known robotic pool cleaning system having an underwater station that requires the robot to be controlled to enter and leave the station for receiving and discharging filters. This known robotic pool cleaning system is a bulky and expensive that unduly complex to operate.

SUMMARY OF THE INVENTION

In one embodiment, a submersible automated cleaning device includes a device body configured to move along the bottom of a pool and a filter canister mounted within the device body. A plurality of filter cassettes is releasably mounted within the filter canister, each filter cassette having a filter bag and a float bag. The filter bag is configured to permit debris to enter the filter bag. A cartridge is mounted to the device body configured to release a gas into one of the float bags to inflate the float bag. A controller is configured to activate the cartridge to release the gas into the float bag in response to detecting that the filter bag is full and to release the filter cassette from the filter canister upon inflation of the float bag.

In one embodiment, the floating debris bag has a transmitter for releasing a signal upon reaching the top of the water. A method for removing the floating debris bag includes receiving by a drone operator the signal from the floating debris bag to alert the drone operator that the floating debris bag is floating in the water, capturing by the drone the floating debris bag and removing by the drone the captured debris bag from the water.

In one embodiment, a pool floating debris bag collection system includes a submersible automated cleaning device having a floating debris bag. The submersible automated cleaning device is configured to selectively release the floating debris bag into the pool water. The floating debris bag has a transmitter for releasing a signal upon reaching the top of the water. A receiver is attached to a pool skimmer for activating a pool skimmer pump in response to the signal from the floating debris bag. A sensor attached to the pool skimmer detects that the floating debris bag has reached the pool skimmer and sends an alert in response to the detection. In one embodiment, the pool floating debris bag collection system includes a pick-up mechanism configured to automatically remove the floating debris bag from the water in response to the detection.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

In one embodiment, a system and method is disclosed in which a pool cleaning robot will have multiple debris collection bags, each bag will be surrounded by or connected to deflated balloon. At any point of time only one debris collection will be connected to the robot. The robot will also have one or more a cartridges, such as a $CO_2$ whip cream cylinders, to inflate the connected balloon. Once a debris collection bag is full, then the robot will encapsulate the debris bag and will inflate the connected or covered balloon with stored $CO_2$ gas. The robot will disconnect the debris collection bag after the $CO_2$ is filled in the balloon. The buoyancy force of the filled balloon will cause the debris bag rise to the top of the pool water and will float in the water.

Figure 1:
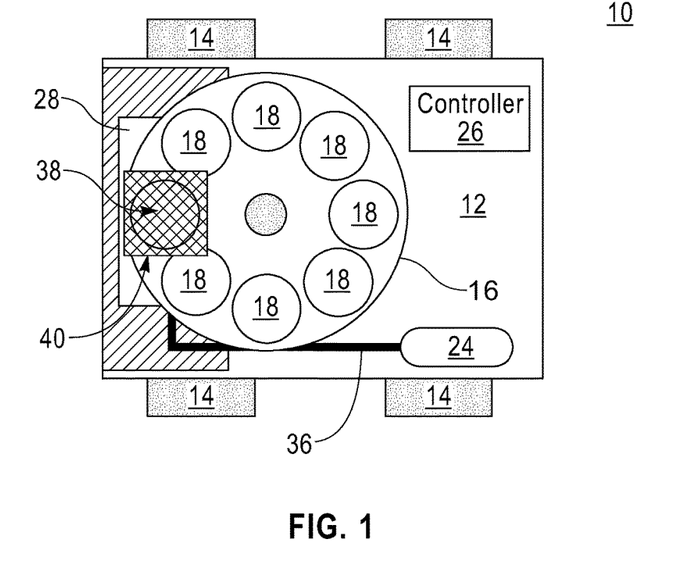
FIG. 1 is a schematic diagram of a top view of one embodiment of the pool cleaning robot disclosed in this specification.
Figure 2:
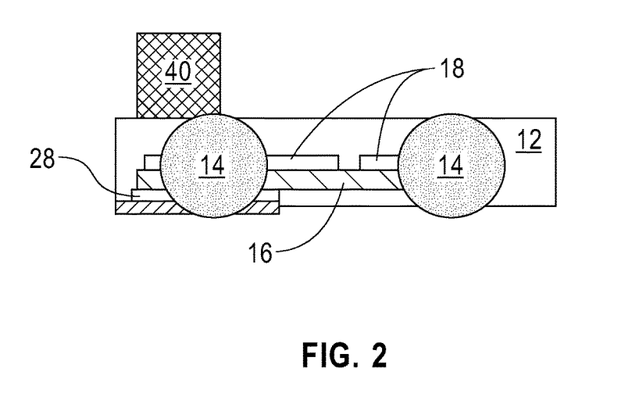
FIG. 2 is a schematic diagram of a side view of one embodiment of the pool cleaning robot disclosed in this specification.
Figure 3:
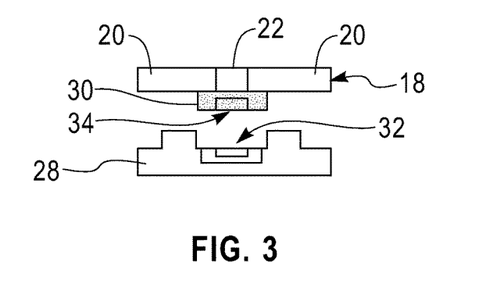
FIG. 3 is a schematic diagram of a side view of one embodiment a filter cassette and a mating vacuum pump and valve of the pool cleaning robot disclosed in this specification.
Figure 4:
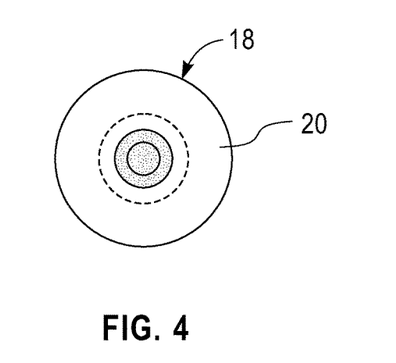
FIG. 4 is a bottom view of one embodiment of a filter cassette of the pool cleaning robot disclosed in this specification.
Figure 5:
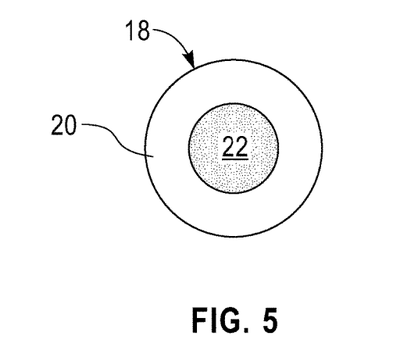
FIG. 5 is a top view of one embodiment of a filter cassette of the pool cleaning robot disclosed in this specification.

FIGS. 1-5 are schematic drawings of one embodiment of a submersible pool cleaning robot 10. The robot 10 includes a robot body 12 having wheels 14 configured to move the robot 10 along the bottom of a pool. A filter canister 16 is mounted within the robot body 12. A plurality of filter cassettes 18 are releasably mounted within the filter canister 16. Each filter cassette 18 has a filter bag 20 and a float bag 22. In one embodiment of the submersible pool cleaning robot 10, the filter bag 20 concentrically surrounding the float bag 22 as shown in FIGS. 3-5, however, any suitable arrangement of filter bag 20 and float bag 22 may be used. The filter bag 20 is configured to permit debris to enter the filter bag 20. A cartridge 24, such as a $CO_2$ cylinder, is mounted to the robot body 12 and is configured to release a gas into one of the float bags 22 of one of the filter cassettes 18 to inflate the float bag 22. A controller 26 is provided on the robot body 12 and is configured to activate the cartridge 24 to release the gas into the float bag 22 in response to detecting that the filter bag 22 is full and to release the filter cassette 18 from the filter canister 16 upon inflation of the float bag 22. The controller may be implemented by program module 102 described later in connection with FIG. 8.

The submersible pool cleaning robot 10 includes a vacuum pump 28 mounted within the robot body 12. The vacuum pump 28 is in fluid communication with an inlet valve 30. The inlet valve 30 serves as an inlet for both the filter bag 20 and the float bag 22. In one embodiment, as shown in FIG. 3, the vacuum pump 28 and the inlet vale 30 have mating coaxial ports 32 and 34, respectively, such that, when a filter cassette 18 is seated within the vacuum pump 28, an air tight connection is made to permit the vacuum pump to draw debris into the filter bag 20 and to allow $CO_2$ to flow into the float bag 22 through air line 36 (see FIG. 1). In one embodiment, the controller 26 is configured to determine, based on depth of water and weight of debris, the amount of gas to be released into the float bag 22 from the cartridge 24 so that the float bag 22 will have sufficient buoyancy force for the float bag 22 to float to the top of the water.

In one embodiment, a filter bag sensor (not shown) is mounted to the robot body 12 for sensing that a filter bag 20 is full. In one embodiment, a float bag sensor (not shown) is mounted to the robot body 12 for sensing that a float bag 22 is fully inflated. Various known sensor arrangements may be used such as light sensors mounted to the filter canister 16 for sensing when the respective filter bag 20 and float bag 22 have been filled to a certain height.

In one embodiment, the canister 16 is rotatable to selectively position each filter bag at a debris collection position 38. The controller is configured to automatically activate the vacuum pump 28 in response to a signal from a sensor detecting that a filter cassette 18 is in the debris collection position 38. The controller is also configured to automatically rotate the canister 16 in response to a signal that a cassette 18 has been released. In one embodiment, the cassettes 18 are released through a cassette release chimney 40 mounted to the robot body 12 at the debris collection position 38. The canister 16 rotates to position another filter cassette 18 at the debris collection position 38 and then the controller activates a mechanism seat the cassette 18 within the vacuum pump 28 and for connecting the mating connector ports 32 and 34.

Figure 6A:
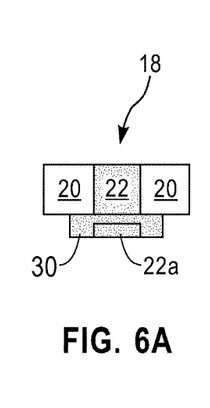
FIGS. 6A-6D are a schematic diagram of the various states of operation of one embodiment of a filter cassette of the pool cleaning robot disclosed in this specification.
Figure 6B:
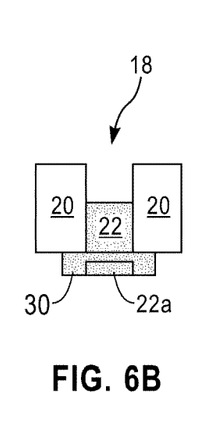
Figure 6C:
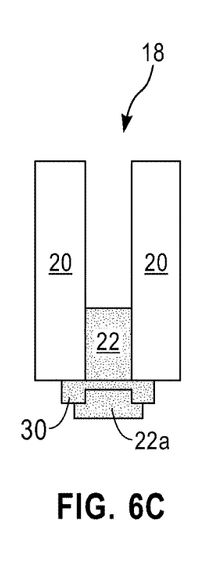
Figure 6D:
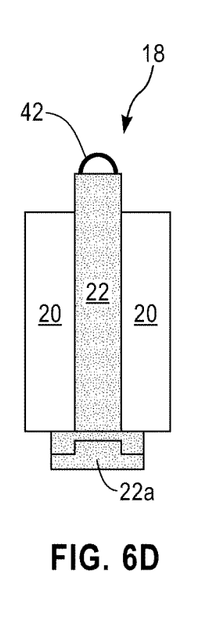

FIGS. 6A-6D depict schematically the steps involved in one embodiment of filling a filter bag 20 and a float bag 22. FIG. 6A shows a cassette 18 in which the filter bag 20 and float bag 22 are in the initial non-inflated state. As can be seen, a portion 22a of float bag 22 extends through inlet valve 30. FIG. 6B shows the filter bag 20 in a partially inflated state as the submersible pool cleaning robot 10 moves along the bottom of a pool collecting debris. FIG. 6C shows the filter bag 20 in a filled state. When a sensor (not shown) detects that the filter bag 20 is filled, the controller shuts down the vacuum pump and activates the cartridge 24 to start inflating the float bag 22 with gas. As shown in FIG. 6C, the float bag 22 is in a partially inflated state. As also shown in FIG. 6C, in one embodiment, the portion 22a of float bag 22 begins to cover the inlet valve 30 during inflation. FIG. 6D shows the float bag 22 in the fully inflated state. Portion 22a of float bag 22 completely covers the inlet 30 to prevent debris from entering or exiting the filter bag 20. Once the controller 26 detects the signal indicating that the float bag 22 is fully inflated, the cassette 18 is released from the canister into the water. The float bag 22 may have a handle portion 42 for purposes of removal of the cassette 18 from the pool after the cassette 18 floats to the top of the water. In one embodiment, a pole can be used to catch and remove the cassette from the pool.

In one embodiment, the cassette 18 has a transmitter (not shown) for sending a signal upon reaching the top of the water to provide an alert. In one embodiment, a method for removing the floating cassette 18 includes receiving by a drone operator the signal from the cassette 18 to alert the drone operator that the cassette 18 is floating in the water, capturing by the drone the cassette 18 and removing by the drone the captured cassette 18 from the water.

The drone (not shown) may be configured to receive the signal from the cassette 18 to assist the operator in locating cassette 18 floating in the water. The drone operator maneuvers the drone to capture and remove the floating cassette 18 from the water.

In one embodiment, a receiver (not shown) is attached to a pool skimmer for activating a pool skimmer pump in response to the signal from the floating debris bag. A sensor (not shown) is attached to the pool skimmer for detecting that the floating debris bag has reached the pool skimmer and sending an alert in response to the detection. An automated pick-up mechanism (not shown) may be provided to automatically remove the floating debris bag from the water in response to the detection.

Figure 7:
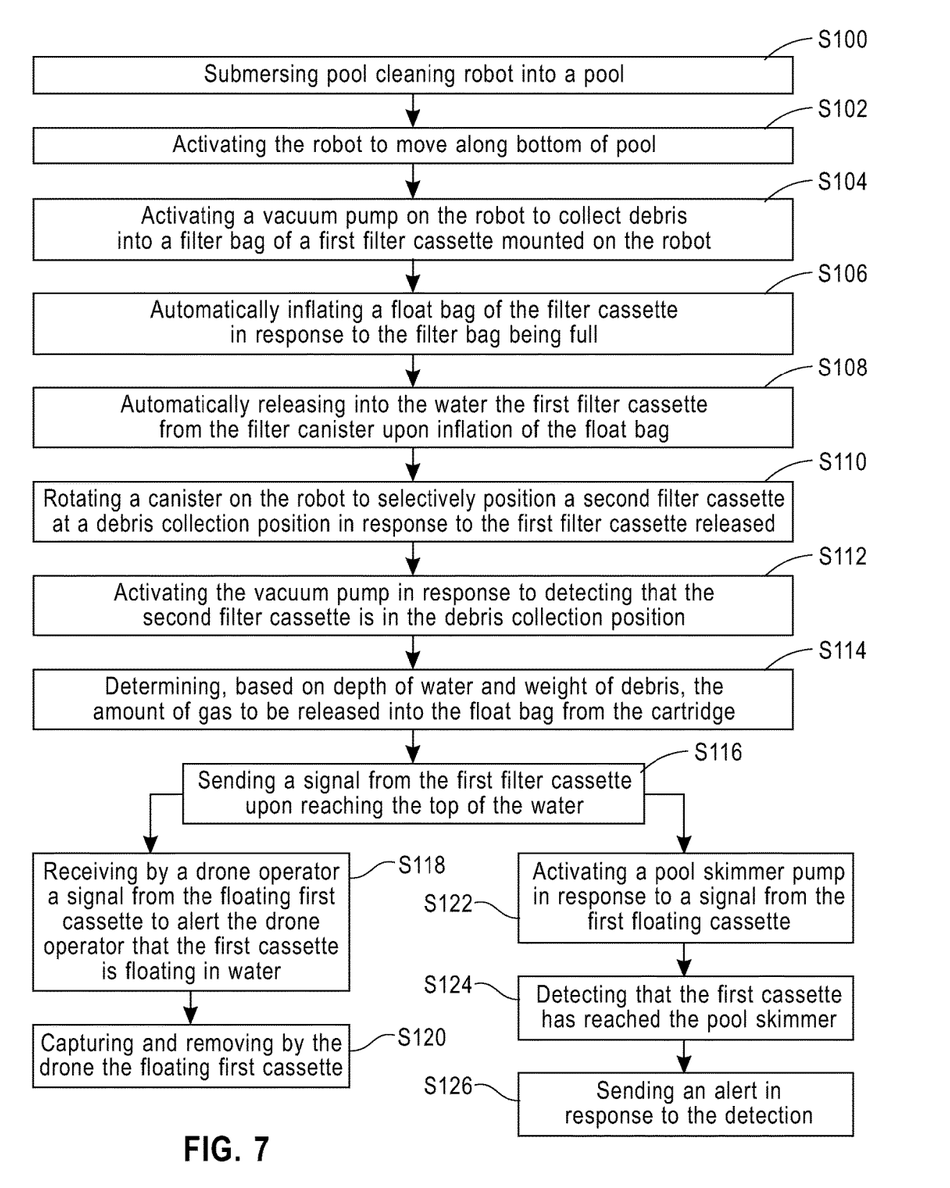
FIG. 7 is a flow diagram of one embodiment of the method disclosed in this specification.

FIG. 7 is a flow chart showing several embodiments of computer implemented methods for robotically cleaning a pool. One embodiment includes step S100 submersing pool cleaning robot into a pool, step S102 activating the robot to move along bottom of pool, step S104 activating a vacuum pump on the robot to collect debris into a filter bag of a first filter cassette mounted on the robot, step S106 automatically inflating a float bag of the filter cassette in response to the filter bag being full and step S108 automatically releasing into the water the first filter cassette from the filter canister upon inflation of the float bag. Another embodiment includes step S110 rotating a canister on the robot having a plurality of filter cassettes to selectively position a second filter cassette at a debris collection position in response to a signal that the first filter cassette has been released and step S112 activating the vacuum pump in response to detecting that the second filter cassette is in the debris collection position. One embodiment includes step S114 determining, based on depth of water and weight of debris, the amount of gas to be released into the float bag from the cartridge.

In another embodiment, the method includes step S116 of sending a signal from the first filter cassette upon reaching the top of the water. In step S118 receiving by a drone operator the signal from the floating first cassette to alert the drone operator that the first cassette is floating in the water and step S120 capturing and removing by the drone the floating first cassette. In an alternative embodiment, the method includes step S122 activating a pool skimmer pump in response to the signal from the first floating cassette, step S124 detecting that the first cassette has reached the pool skimmer and step S126 sending an alert in response to the detection. The signal in step S116 and the alert in step S126 may be one of light, sound and an electronic message. The electronic message may be an email, SMS or other form of electronic message.

Figure 8:
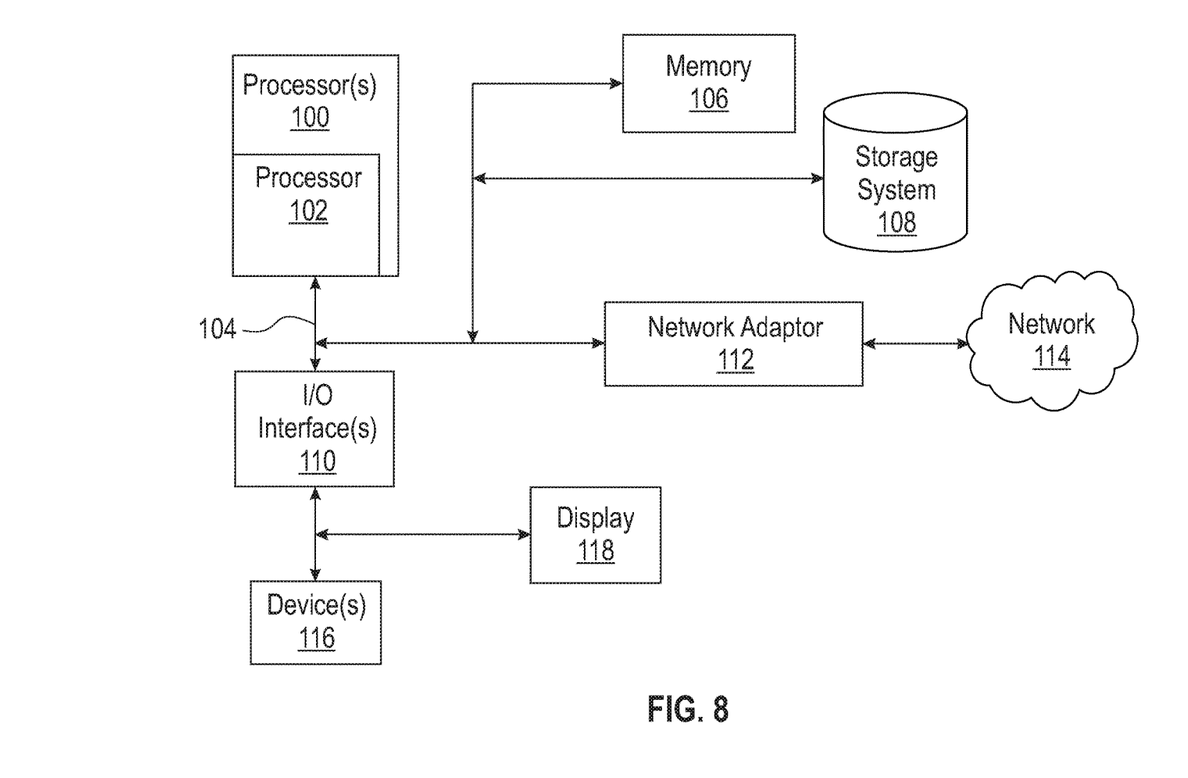
FIG. 8 is a block diagram of an exemplary computing system suitable for implementation of the embodiments disclosed in this specification.

FIG. 8 illustrates a schematic of an example computer or processing system that may implement the controller in one embodiment of the present disclosure for controlling the submersible pool cleaning robot, the pool floating debris bag collection system and the method for robotically cleaning a pool. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform a particular task, or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A submersible automated cleaning device comprising:
a device body configured to move along the bottom of a pool;
a filter canister mounted within the device body,
a plurality of filter cassettes releasably mounted within the filter canister, each filter cassette having a filter bag and a float bag, the filter bag being configured to permit debris to enter the filter bag;
a cartridge mounted to the device body configured to release a gas into the float bag of one of the plurality of filter cassettes to inflate the float bag; and
a controller configured to activate the cartridge to release the gas into the float bag in response to detecting that the filter bag is full and to release the filter cassette from the filter canister upon inflation of the float bag.

2. The submersible automated cleaning device of claim 1, wherein the filter bag concentrically surrounds the float bag.

3. The submersible automated cleaning device of claim 1, further including a vacuum pump mounted within the device body, the vacuum pump being in fluid communication with an inlet valve of the filter bag; a filter bag sensor mounted to the device body for sensing that the filter bag of one of the plurality of filter cassettes is full; and a float bag sensor mounted to the device body for sensing that the float bag of one of the plurality of filter cassettes is fully inflated.

4. The submersible automated cleaning device of claim 3, wherein the canister is rotatable to selectively position each filter bag at a debris collection position, and wherein the controller is configured to activate the vacuum pump in response to a signal from a sensor detecting that a filter cassette is in the debris collection position and to rotate the canister in response to a signal that a filter cassette has been released.

5. The submersible automated cleaning device of claim 3, wherein a portion of the float bag is configured to cover the inlet valve during inflation to prevent debris from entering the filter bag.

6. The submersible automated cleaning device of claim 1, wherein the controller is configured to determine, based on depth of water and weight of debris, the amount of gas to be released into the float bag from the cartridge so that the float bag will have sufficient buoyancy force for the float bag to float to the top of the water.

7. The submersible automated cleaning device of claim 1, wherein the float bag has a transmitter for sending a signal upon reaching the top of the water.

8. The submersible automated cleaning device of claim 7, wherein the signal is one of light, sound and an electronic message.

9. A pool floating debris bag collection system comprising:
- a submersible automated cleaning device having a floating debris bag, the submersible automated cleaning device being configured to selectively release the floating debris bag into the pool water, the floating debris bag having a transmitter for releasing a signal upon reaching the top of the water;
- a receiver attached to a pool skimmer for activating a pool skimmer pump in response to the signal from the floating debris bag; and
- a sensor attached to the pool skimmer for detecting that the floating debris bag has reached the pool skimmer and sending an alert in response to the detection.

10. The pool floating debris bag collection system of claim 9, further including a pick-up mechanism configured to automatically remove the floating debris bag from the water in response to the detection.

11. The pool floating debris bag collection system of claim 9, wherein the submersible automated cleaning device comprises:
- a device body configured to move along the bottom of a pool;
- a filter canister mounted within the device body,
- a plurality of filter cassettes releasably mounted within the filter canister, each filter cassette having a filter bag and a float bag, the filter bag being configured to permit debris to enter the filter bag;
- a cartridge mounted to the device body configured to release a gas into the float bag of one of the plurality of filter cassettes to inflate the float bag; and
- a controller configured to activate the cartridge to release the gas into the float bag in response to detecting that the filter bag is full and to release the filter cassette from the filter canister upon inflation of the float bag.

12. The pool floating debris bag collection system of claim 11, further including a vacuum pump mounted within the device body, the vacuum pump being in fluid communication with an inlet valve of the filter bag; a filter bag sensor mounted to the device body for sensing that the filter bag of one of the plurality of filter cassettes is full; and a float bag sensor mounted to the device body for sensing that the float bag of one of the plurality of filter cassettes is fully inflated.

13. The pool floating debris bag collection system of claim 12, wherein the filter bag concentrically surrounds the float bag and wherein a portion of the float bag is configured to cover the inlet valve during inflation to prevent debris from entering the filter bag.

14. The pool floating debris bag collection system of claim 12, wherein the canister is rotatable to selectively position each filter bag at a debris collection position, and wherein the controller is configured to activate the vacuum pump in response to a signal from a sensor detecting that a filter cassette is in the debris collection position and to rotate the canister in response to a signal that a filter cassette has been released.

15. The pool floating debris bag collection system of claim 11, wherein the controller is configured to determine, based on depth of water and weight of debris, the amount of gas to be released into the float bag from the cartridge so that the float bag will have sufficient buoyancy force for the float bag to float to the top of the water.

\* \* \* \* \*